April 20, 1926.

F. L. BROUSSOUSE 1,581,916

METHOD OF DAMPING OSCILLATIONS IN LEAF SPRINGS
FOR VEHICLE SUSPENSION AND OTHER PURPOSES
Filed Oct. 11, 1924

INVENTOR
Fernand L. Broussouse
BY
ATTORNEYS

Patented Apr. 20, 1926.

1,581,916

UNITED STATES PATENT OFFICE.

FERNAND LOUIS BROUSSOUSE, OF PARIS, FRANCE.

METHOD OF DAMPING OSCILLATIONS IN LEAF SPRINGS FOR VEHICLE SUSPENSION AND OTHER PURPOSES.

Application filed October 11, 1924. Serial No. 743,032.

*To all whom it may concern:*

Be it known that I, FERNAND LOUIS BROUSSOUSE, a citizen of the French Republic, and residing in Paris, Seine, France, have invented certain new and useful Improvements in and Relating to Methods of Damping Oscillations in Leaf Springs for Vehicle Suspension and Other Purposes, of which the following is a complete specification.

In my prior co-pending application Serial No. 725,570, has been described a method of damping the oscillations in suspension leaf springs and others, by the producing between the leaves constituting the spring, of an elastic friction, by means of a static tension; that is to say, a tension independent of the load on a part of each of the said leaves themselves, the intensity of this elastic friction being regulatable if desired, and tending to oppose the continuity of the oscillations for obtaining a very smooth suspension.

This tension is obtained by suitably curving the leaves, the curvature being suitably different from the general curvature of the spring, and the fixing of the assembled leaves is carried out by means of straps which may be kept in the position of assembly by welding.

This application relates to a form of construction of a leaf suspension spring set forth in said prior application, and includes a special form of curvature of the leaves as well as an arrangement of the maintaining strap.

One form of construction according to this arrangement is illustrated in the accompanying drawing, by way of example.

In these figures, it is to be noted that all or part of the leaves have, in addition to the normal curvature 13, two curves at the ends 14, 15 of suitable radius to give the internal static tension independent of the load in the manner described in the main patent and a good homogeneous tightening over the length of the spring, by means of the strap.

Figure 1:
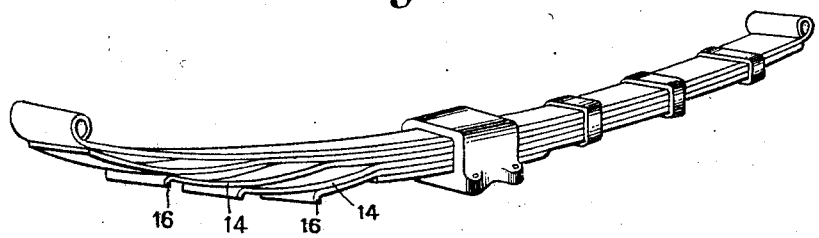
Figure 1 illustrates a spring the leaves of which are free at the left hand end and assembled at the right hand end.
Figure 2:
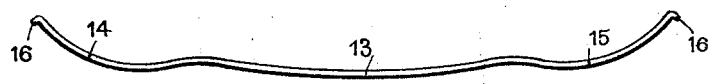
Figure 2 is a detail of a leaf showing the preparatory double curvature of this leaf.
Figure 3:
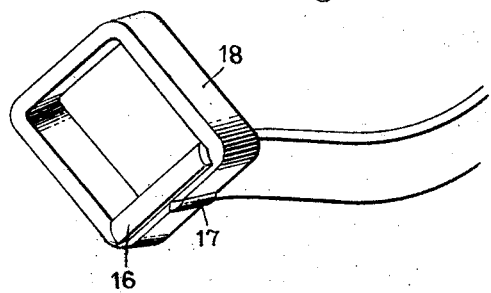
Figure 3 shows the welding of a strap.

As is shown more particularly in Figure 3 each strap is held in position on the spring by a heel 16, formed at each end of each leaf, and the welding zone of the strap 18 is situated underneath, by the end of the leaf, so that an untimely heating of the leaf of the spring, occasioned by the welding, will only influence a part of the metal of the leaves the elastic action of which is very slight.

The assembly, the regulation and the operation of the spring take place under the same conditions as those described in the beforementioned prior application.

What I claim is:

1. A spring of the character described comprising a plurality of spring leaves of varying lengths, each leaf including a concave body portion for supporting the load, and concave end portions of suitable radius and length, and means for obtaining static tension in said leaves independent of the load, said means consisting of tightening straps confining said concave end portions.

2. A leaf spring as set forth in claim 1, characterized by welding straps holding the leaves in assembled position, said straps welded to the underside of the end portions of the associated leaves.

3. A leaf spring as set forth in claim 1, further characterized by a heel at the extremities of the concave end portions of the leaves, adapted to hold the assembly strap in position.

In testimony whereof I have hereunto set my hand.

FERNAND LOUIS BROUSSOUSE.